United States Patent Office 3,415,803
Patented Dec. 10, 1968

3,415,803
HEXA- AND HEPTAPEPTIDES RELATED TO THE C-TERMINAL SEQUENCE OF ELEDOISIN
Klaus Lübke, Eberhard Schröder, Reinhard Hempel, and Ralph Schmiechen, Berlin, Germany, assignors to Schering Aktiengesellschaft, Berlin, Germany
No Drawing. Filed Feb. 27, 1964, Ser. No. 347,950
Claims priority, application Germany, Mar. 1, 1963, Sch 32,860; Oct. 31, 1963, Sch 34,086; Jan. 4, 1964, Sch 34,464
13 Claims. (Cl. 260—112.5)

The present invention relates to new polypeptides and to methods of producing the same, and more particularly to heptapeptides and hexapeptides.

It is an object of the present invention to provide new synthetic hexapeptides and heptapeptides.

It is another object of the present invention to provide methods of producing the new polypeptides, e.g. hexapeptides and heptapeptides of the present invention.

It is another object of the present invention to provide new hexapeptides and heptapeptides which have a highly effective blood pressure lowering action.

It is yet another object of the present invention to provide for the reduction of the blood pressure of patients requiring the same by the administration of the new hexapeptides and heptapeptides of this invention.

Other objects and advantages of the present invention will be apparent from a further reading of the specification and of the appended claims.

With the above and other objects in view, the present invention mainly comprises a polypeptide of the formula:

R-L-alanyl-L-phenylalanyl - L - α - aminoacyl-glycyl - L-leucyl-L-methioninamide wherein R is either hydrogen or a natural Lα-amino acid radical other than L-aspartyl, and wherein L-α-aminoacyl is selected from the group consisting of L-isoleucyl, L-leucyl and L-valyl radicals.

The natural L-α-amino acid radicals of the substituent R are preferably the L-forms of the radicals of glycine, alanine, valine, leucine, isoleucine, asparagine, glutamine, serine, threonine, cysteine, methionine, phenylalanine, tyrosine, proline, oxyproline, lysine, histidine, arginine, ornithine, norleucine, norvaline, α-aminobutyric acid, α,γ-diaminobutyric acid, pyroglutamic acid, the N-methyl-amino acids such as sarcosine, N-methylvaline, N-methylleucine, and tryptophane.

It is known that there is present in the salivary glands of marine animals which manufacture and can discharge inks, such as sepia, cuttlefish, squid and the octopus, for example eledone moschata, contain the undecapeptide eledoisin of the formula:

L-pyroglutamyl-L-prolyl-L-seryl-L-lysyl - L - aspara - gyl-L - alanyl - L - phenylalanyl - L - isoleucyl - glycyl - L-methioninamide which has a blood pressure lowering action, a vessel dilating action, and which also acts to stimulate breathing. This substance consequently is a valuable therapeutic substance.

It has been found according to the present invention that the hexapeptides and heptapeptides of the general formula:

R-L-alanyl-L-phenylalanyl - L-α - aminoacyl - glycyl - L-leucyl-L-methioninamide wherein R and L-α-aminoacyl have the same definitions as above, quite surprisingly has the same or practically the same activity in the lowering of blood pressure, blood vessel dilation and stimulation of breathing as does eledoisin. In addition, these new hexapeptides and heptapeptides of the present invention provide advantages as compared to eledoisin.

The exchange of amino acids in the 1-position of the above general formula of the new polypeptides of the present invention, and the alternate exchange of isoleucine, valine and leucine in the 4-position are independent of each other in their influence on the activity of the polypeptides of the present invention, and also, independent of the exchange in the other positions of the molecule. It has been found that the action of the three analogs with isoleucine, valine and leucine is in the ratio of 10:10:1.

The use of hexapeptides instead of the undecapeptide for the same purposes already constitutes a considerable advantage because of the smaller molecule size, and in addition, the further advantage is obtained in connection with the arbitrary incorporation of natural L-α-amino acids in the 1-position of the heptapeptides. These advantages are of a therapeutic nature and also in connection with the manufacture of the final preparations.

From the standpoint of manufacture of the final preparations, it is advantageous to use in the 1-position of the polypeptides of the present invention simple amino acids such as glycine, alanine, valine and leucine. By doing this it is possible to avoid the disadvantages of the corresponding use of complicated amino acids, such advantages as side reactions and lower yields.

It is further advantageous to use such amino acids which increase the water solubility of the final product, for example lysine, histidine, arginine, threonine, serine or tyrosine. The increased solubility simplifies not only the synthesis itself, but also the purification of the final product.

Furthermore, the increased water solubility constitutes a therapeutic advantage since it makes possible to administer higher doses in relatively smaller amounts of liquids. This is particularly advantageous in the case of subcutaneous administration.

The limiting dose at which the polypeptides of the present invention are still active is, in the case of subcutaneous administration, about $\frac{1}{1000}$ of the limiting dose in the case of intravenous administration. (For comparison: In the case of eledoisin, according to V. Ersparmer and A. Glaesser, Brit. J. of Pharmacol. and Chemotherapy, 20, 516 (1963) on dogs the limiting dose intravenously is 0.2–5 ng./kg., while subcutaneously it is 1–2γ/kg.) To dissolve a therapeutically sufficient amount of, for example, L-lysyl-L-alanyl-L-phenyl-alanyl-L-valyl-glycyl - L - leucyl-L-methioninamide, it is sufficient to use 0.2–0.5 cc. of water per rabbit, while, for example, to dissolve an amount of equal activity of Lasparagyl- or L-asparaginyl-L-leucyl-L-alanyl-L-phenylalanyl-L-isoleucyl-glycyl - L - methioninamide or L-glycyl-L - alanyl-L-phenylalanyl-L - valyl-glycyl-L-leucyl-L-methioninamide, about 5 cc. of water is needed. Solutions of the last named compound, because of the requirement of too great a volume of water, therefore are not particularly suitable for subcutaneous administration.

The particular advantage of subcutaneous administration is in the fact that the duration of the blood pressure lowering is increased about ten fold thereby.

The following table gives the blood pressure lowering effect on rabbits upon intravenous administration of various doses of the polypeptides of the present invention (I–XVI) and bradykinin (XVII).

The rabbits were anaesthetized by the administration subcutaneously of 1.2 g./kg. of urethane.

TABLE
[Blood pressure lowering in percent on rabbits (Dose ng./kg) [1]]

| Compound No. | 1 ng. | 2 ng. | 5 ng. | 10 ng. | 20 ng. | 50 ng. | 100 ng. | 200 ng. |
|---|---|---|---|---|---|---|---|---|
| I     |    | 3  | 10 | 19 | 35 | 38 |    |    |
| II    |    | 3  | 5  | 15 | 21 | 28 | 36 | 41 |
| III   |    |    |    | 4  | 7  | 15 | 18 | 20 |
| IV    |    |    |    | 7  | 13 | 19 | 28 | 32 |
| V     | 4  | 8  | 25 | 30 | 36 | 39 | 39 |    |
| VI    |    |    | 5  | 10 | 13 | 13 |    |    |
| VII   | 9  | 15 | 25 | 30 | 34 | 42 | 48 | 73 |
| VIII  | 2  | 13 | 19 | 32 | 34 | 44 | 49 | 50 |
| IX    | 9  | 13 | 18 | 28 | 32 | 42 | 40 | 50 |
| X     | 20 | 13 | 23 | 34 | 34 | 41 | 43 | 45 |
| XI    | 15 | 15 | 24 | 31 | 35 | 40 | 44 | 48 |
| XII   |    |    | 2  | 8  | 15 | 16 |    |    |
| XIII  | 20 | 16 | 27 | 34 | 38 | 43 | 47 | 48 |
| XIV   |    |    | 3  | 5  | 8  | 12 | 17 | 23 |
| XV    | 15 | 12 | 19 | 26 | 28 | 34 | 43 | 46 |
| XVI   | 2  | 10 | 12 | 20 | 25 | 30 | 38 | 43 |
| XVII  |    |    |    |    | 7  | 20 | 22 |    |

[1] Ng.=$10^{-9}$ g.

The following are the compounds which are used and the results of which are set forth in the above table:

I=H-Ala-Phe-Ileu-Gly-Leu-Met-$NH_2$
II=H-Ala-Phe-Val-Gly-Leu-Met-$NH_2$
III=H-Ala-Phe-Leu-Gly-Leu-Met-$NH_2$
IV=H-Asp($NH_2$)-Ala-Phe-Leu-Gly-Leu-Met-$NH_2$
V=H-Glu($NH_2$)-Ala-Phe-Ileu-Gly-Leu-Met-$NH_2$
VI=H-Glu($NH_2$)-Ala-Phe-Leu-Gly-Leu-Met-$NH_2$
VII=H-Asp($NH_2$)-Ala-Phe-Ilue-Gly-Leu-Met-$NH_2$
VIII=H-Gly-Ala-Phe-Ileu-Gly-Leu-Met-$NH_2$
IX=H-Gly-Ala-Phe-Val-Gly-Leu-Met-$NH_2$
X=H-Lys-Ala-Phe-Ileu-Gly-Leu-Met-$NH_2$
XI=H-Lys-Ala-Phe-Val-Gly-Leu-Met-$NH_2$
XII=H-Lys-Ala-Phe-Leu-Gly-Leu-Met-$NH_2$
XIII=H-Ser-Ala-Phe-Ileu-Gly-Leu-Met-$NH_2$
XIV=Pyroglu-Ala-Phe-Leu-Gly-Leu-Met-$NH_2$
XV=H-Sar-Ala-Phe-Ilen-Gly-Leu-Met-$NH_2$
XVI=H-Sar-Ala-Phe-Val-Gly-Leu-Met-$NH_2$
XVII=Bradykinin The synthesis of the new polypeptides of the present invention can be carried out using methods commonly used in the synthesis of polypeptides, preferably using the method of mixed anhydrides, the azide method or the carbodiimide method, or the activated ester method (compare the monograph of Greenstein and Winitz, "Chemistry of the Amino Acids," Wiley & Sons, New York, London (1961)).

The amino acid sequence is advantageously built up in small portions. The functional groups which are not concerned in the reaction are if necessary intermediately blocked by means of common protective groups.

The methods of producing the polypeptides of the present invention are clear from the following reaction scheme I–IV in which the following symbols are used:

H-Gly-OH=glycerine
H-L-Ala-OH=L-alanine
H-L-Phe-OH=L-phenylalanine
H-L-Val-OH=L-valine
H-L-Leu-OH=L-leucine
H-L-Ileu-OH=L-isoleucine
H-L-Met-OH=L-methionine
H-L-Ser-OH=L-serine
H-L-Lys-OH=L-lysine H-L-Glu($NH_2$)-OH = L-glutamine H-L-Sar-OH=L-sarcosine
L-Pyroglu-OH=L-pyroglutaminic acid H-L-Asp($NH_2$)-OH = L-asparagine Cbo=carbobenzoxy
BOC=carbo-tert.-butoxy
MeOCbo=p-methoxycarbobenzoxy
$PhNO_2$=p-nitrophenyl
Me=methyl Furthermore, in the reaction schematic below, the letter "L" used to indicate the configuration has been omitted:

Reaction scheme I

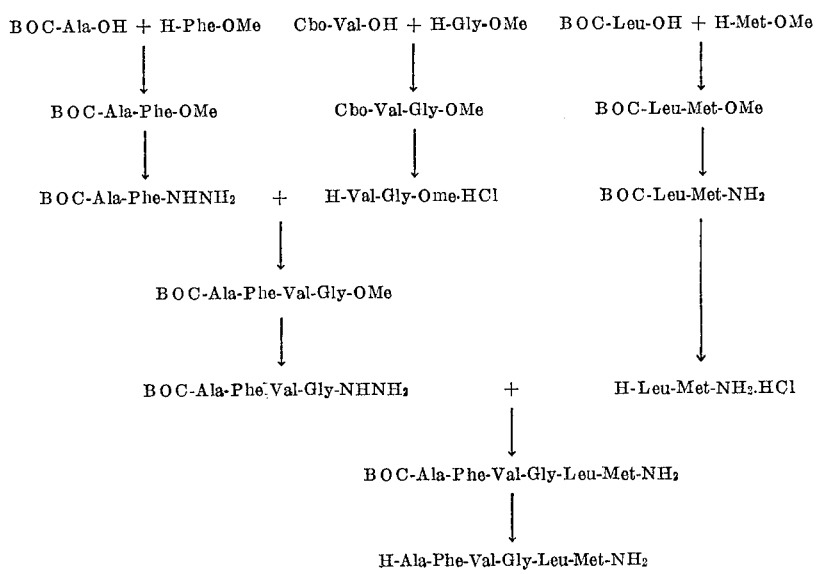

Reaction scheme II

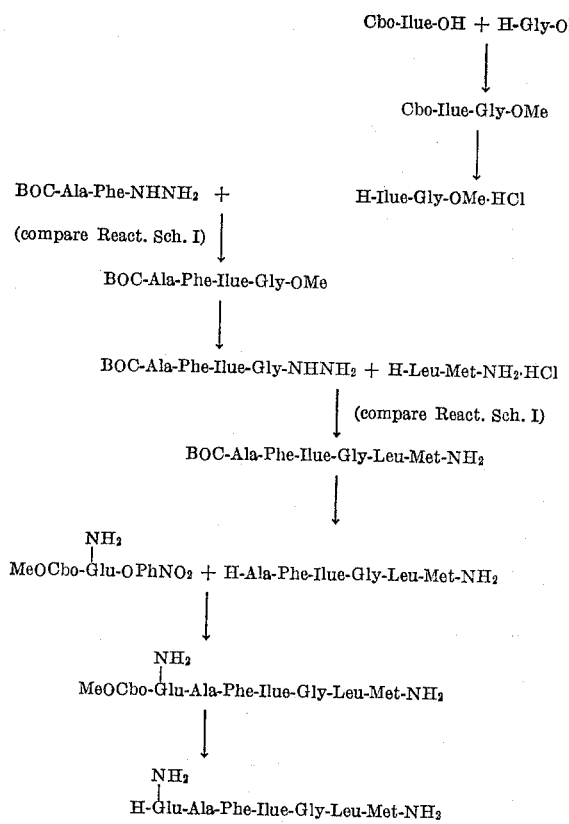

Reaction scheme III

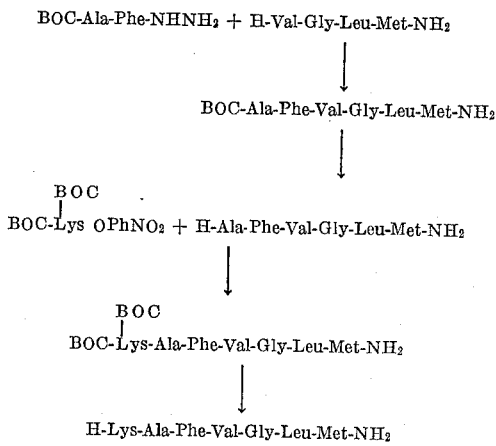

Reaction scheme IV

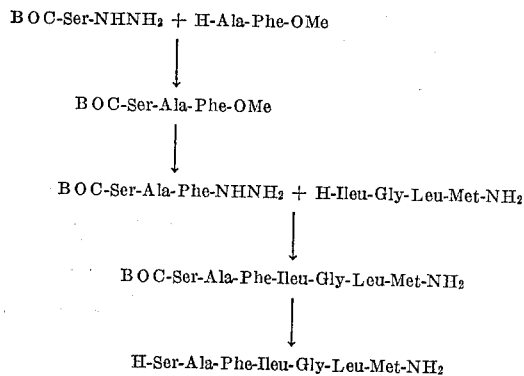

The following examples are given to further illustrate the present invention. The scope of the invention is not, however, meant to be limited to the specific details of the examples:

EXAMPLE 1

(a) BOC-L-Ala-L-Phe-OMe 9.5 g. (50 mmols) of BOC-L-Ala-OH are converted with 7 cc. (50 mmols) of triethylamine and 4.8 cc. (50 mmols) of chloroformic acid-ethyl ester in normal manner in tetrahydrofurane into the anhydride, and coupled with H-L-Phe-OMe which has been freed from 12.9 g (60 mmols) of the hydrochloride and 8.4 cc. of triethylamine in dimethylformamide. After the working up it is recrystallized from ethyl acetate/petroleum ether. The yield is 14.6 g corresponding to 82% of the theoretical. The melting point is 88–89° C. $[\alpha]_D = -7.2°$ (c.=1, glacial acetic acid), $-26.9°$ (c.=1; chloroform).

(b) BOC-L-Ala-L-Phe-NHNH$_2$

BOC-L-Ala-L-Phe-NHNH$_2$ is obtained from BOC-L-Ala-L-Phe-OMe by the action thereon of eight times the amount of hydrazine hydrate in methanol at room temperature for 48 hours. The hydrazide is crystallized out, filtered off under suction and washed with ethanol and ether. It can be recrystallized from methanol. The yield is 85% of the theoretical. The melting point is 162–163° C. $[\alpha]_D = -22.6°$ (c.=1; glacial acetic acid).

(c) Cbo-L-Val-Gly-OMe 25.1 g. (100 mmols) of Cbo-L-Val-OH in tetrahydrofurane are converted into the mixed anhydride with 14 cc. (100 mmols) of triethylamine and 10 cc. (100 mmols) of chloroformic acid-ethyl ester at $-20°$ C., and reacted with 15.0 g. (120 mmols) of H-Gly-OMe·HCl and 16.8 cc. (120 mmols) of triethylamine dissolved in dimethylformamide. After working up in the usual manner it is recrystallized from ethyl acetate. The yield is 22.9 g. (70% of the theoretical) the melting point is 151–152° C. $[\alpha]_D = -26.4°$ (c.=1; glacial acetate acid).

(d) H-L-Val-Gly-OMe·HCl

H-L-Gly-OMe·HCl is produced by catalytic hydrogenation of Cbo-L-Val-Gly-OMe with palladium black in methanol and the equivalent amount of 1N hydrochloric acid. After concentration of the solution it is taken up in water and shaken with ethyl acetate. Evaporation of the water under vacuum results in the formation of the desired compound, which is only obtained as an oil. The yield is 80% of the theoretical.

(e) BOC-L-Ala-L-Phe-L-Val-Gly-OMe 17.5 g. (50 mmols) of BOC-L-Ala-Phe-NHNH$_2$ are suspended in 66 cc. of a 1.5 N solution of hydrogen chloride in tetrahydrofurane at $-20°$ C. and reacted with 5.6 g. (61 mmols) of tert.-butylnitrite in 30 cc. of tetrahydrofurane at $-20°$ C. After several shakings, the hydrazide goes into solution. The reaction mixture is diluted with 500 cc. of ethyl acetate and shaken with a sodium bicarbonate solution at the lowest possible temperature. After drying over sodium sulfate, the azide solution is reacted with the amino component obtained from 15.5 g. (69 mmols) of H-Val-Gly-OMe·HCl and 9.7 cc. (69 mmols) of triethylamine in 100 cc. of dimethylformamide, and the reaction mixture is allowed to stand overnight at 0° C. After distilling off of the solvent the residue is dissolved in chloroform, shaken with water, 10% citric acid solution, water, saturated sodium bicarbonate solution and water, dried and concentrated. The yield after recrystallization from ethanol/ethyl acetate/petroleum ether is 17.3 g. which is equivalent to 68% of the theoretical. The melting point is 207–209° C. $[\alpha]_D = -35.2°$ (c.=1; glacial acetic acid).

(f) BOC-L-Ala-L-Phe-L-Val-Gly-NHNH$_2$ 15.2 g. (30 mmols) of BOC-L-Ala-L-Phe-L-Val-Gly-OMe are dissolved in 200 cc. of n-butanol and heated to 80° C. with 6.0 cc. (120 mmols) of hydrazine hydrate, the heating being continued for 2 hours. After concentration under vacuum, the hydrazide is recrystallized from ethanol. The yield amounts to 12.2 g., equivalent to 80% of the theoretical. The melting point is 218–219° C. $[\alpha]_D = -25.3°$ (c.=1; glacial acetic acid).

(g) BOC-L-Leu-L-Met-OMe 24.9 g. (100 mmols) of BOC-L-Leu-OH·H$_2$O, 13.8 cc. (100 mmols) of triethylamine and 10 cc. (100 mmols) of chloroformic acid-ethyl ester in tetrahydrofurane at −20° C., as well as 23.9 g. (120 mmols) of H-L-Met-OMe·HCl and 17.0 cc. (120 mmols) of triethylamine in dimethylformamide are converted in normal manner to BOC-L-Leu-L-Met-OMe. After recrystallization from petroleum ether, 32.5 g. of the compound are obtained, the yield amounting to 86% of the theoretical. The melting point is 97–99- C. $[\alpha]_D = -36.5°$ (c.=1; ethanol).

(h) BOC-L-Leu-L-Met-NH$_2$ 3.8 g. of BOC-L-Leu-L-Met-OMe are dissolved in 15 cc. of methanol and this solution is saturated with ammonia at −5° C. After standing for three days at room temperature the solution is concentrated under vacuum and recrystallized from 70% methanol. The yield is 3.3 g., corresponding to 90% of the theoretical. The melting point is 154–155° C. $[\alpha]_D = -35.1°$ (c.=1; dimethylformamide).

(i) H-L-Leu-L-Met-NH$_2$·HCl·1CH$_3$OH 3.6 g. of BOC-L-Leu-L-Met-NH$_2$ are dissolved in 20 cc. of glacial acetic acid. Hydrogen chloride is conducted therethrough at room temperature for 1 hour. Ether is subsequently added to precipitate the compound and the substance is recrystallized from methanol/petroleum ether. The yield amounts to 3.0 g., corresponding to 90% of the theoretical. The melting point is 188–191° C. $[\alpha]_D = +10.2°$ (c.=1; water).

(k) BOC-L-Ala-L-Phe-L-Val-Gly-L-Leu-L-Met-NH$_2$ 2.53 g. (5 mmols) of BOC-L-Ala-L-Phe-L-Val-Gly-NHNH$_2$ are converted to the azide with 0.61 cc. (6 mmols) of tert. butylnitrite in 6.6 cc. of a 1.5 N solution of hydrogen chloride in tetrahydrofurane at −20° C. As described under (e) it is taken up in ethyl acetate, the solution is washed and dried. 1.9 g. (6 mmols) of H-L-Leu-L-Met-NH$_2$·HCl are converted into the free amide with 0.84 cc. (6 mmols) of triethylamine in dimethylformamide, and the same is reacted with the azide solution in usual manner. The residue obtained after evaporation of the solvent is washed with water, citric acid solution, water, sodium bicarbonate solution and water. The yield is 2.73 g., corresponding to 74% of the theoretical. The melting point is 250° C. (with decomposition). $[\alpha]_D = -34.7°$ (c.=1; glacial acetic acid).

(l) H-L-Ala-L-Phe-L-Val-Gly-L-Leu-Met-NH$_2$ 1.48 g. (2 mmols) of BOC-hexapeptide-amide are dissolved in 3 cc. of 90% trifluoroacetic acid at 0° C., and the solution is permitted to stand for 45 minutes at room temperature. The reaction product is precipitated with ether. The precipitate is dissolved in 50% ethanol, the solution is adjusted to pH 9–10 by the addition of a lithium hydroxide solution, and the ethanol is then mainly distilled off under vacuum. After standing for awhile at 0° C., the residue is filtered off under suction and washed with cold water. The yield is 0.9 g., corresponding to 75% of the theoretical. The melting point is 243–250° C. $[\alpha]_D = -49.3°$ (c.=1; trifluoroacetic acid).

EXAMPLE 2

(a) Cbo-L-Ileu-Gly-OMe

Cbo-L-Ileu-Gly-OMe is obtained from Cbo-L-Ileu-OH and H-Gly-OMe by the anhydride method and recrystallized from ethyl acetate. The yield corresponds to 75% of the theoretical. The melting point is 127–130° C. $[\alpha]_D = -26.6°$ (c.=2; glacial acetic acid).

Literature citation: Determann and Wieland, Makromolekulare Chemie, 44 (1961), p. 312.

(b) H-L-Ileu-Gly-OMe·HCl

H-L-Ileu-Gly-OMe·HCl is obtained from the carbobenzoxy compound by hydrogenation with palladium black as catalyst. After recrystallization from methanol/ether the yield amounts to 87% of the theoretical. The melting point is 181–182° C. $[\alpha]_D = +16.3°$ (c.=1; glacial acetic acid).

Literature citation: Determann and Wieland, Makromolekulare Chemie 44 (1961), p. 312.

(c) BOC-L-Ala-L-Phe-L-Ileu-Gly-OMe 8.9 g. (25 mmols) of BOC-L-Ala-L-Phe-NHNH$_2$ are suspended in 33 cc. of a 1.5 N solution of hydrogen chloride in tetrahydrofurane at −20° C., and reacted with 2.8 g. (27 mmols) of tert.-butylnitrite dissolved in 15 cc. of tetrahydrofurane, at a temperature of −20° C. After some shaking, the hydrazide goes into solution. The reaction mixture is diluted with 250 cc. of glacial acetic acid and shaken at the lowest possible temperature with a sodium bicarbonate solution. After drying over sodium sulfate, the azide solution is reacted with the mixture of 7.1 g. (30 mmols) of H-L-Ileu-Gly-OMe and 4.2 cc. (30 mmols) of triethylamine in 50 cc. of dimethylformamide, and the reaction mass is permitted to stand overnight at 0° C. After distilling off of the solvent, the residue is dissolved in chloroform, shaken with water, 10% citric acid, water, saturated sodium bicarbonate solution and water, then dried, concentrated, and recrystallized from ethanol/petroleum ether. The yield is 9.2 g. (70% of the theoretical). The melting point is 201–204° C. $[\alpha]_D = -34.5°$ (c.=1; glacial acetic acid).

The same compound can be obtained in the following manner: BOC-L-Ala-L-Phe-OMe (note Example 1(a)) is saponified in ethanol with the equivalent amount of 1 N KOH in 40 minutes, most of the ethanol is distilled off under vacuum, and after acidification, the residue is extracted with ethyl acetate. After washing to neutral and drying, the BOC-L-Ala-L-Phe-OH is isolated as a vitreous mass. The yield corresponds to 90% of the theoretical. $[\alpha]_D = +5.1°$ (c.=1; glacial acetic acid).

3.4 g. (10 mmols) of BOC-L-Ala-L-Phe-OH are dissolved in 10 cc. of tetrahydrofurane and reacted at −10° C. with a solution of H-L-Ileu-Gly-OMe which has been produced from 3.5 g. of the hydrochloride and 2.1 cc. of triethylamine in 20 cc. of dimethylformamide. After the addition of 2.5 g. (12 mmols) of N,N'-dicyclohexylcarbodiimide in 5 cc. of tetrahydrofurane, the reaction mixture is stored for 24 hours at 0° C. and subjected to suction filtration to separate the N,N'-dicyclohexylurea. It is then further worked up as described above. The yield is 4.5 g., corresponding to 85% of the theoretical.

(d) BOC-L-Ala-L-Phe-L-Ileu-Gly-NHNH$_2$ 7.8 g. (15 mmols) of BOC-tetrapeptide-OMe in 80 cc. of n-butanol are heated to 60° C. with 2.3 cc. (45 mmols) of hydrazine hydrate for 4 hours. After distilling off of the solvent, the residue is dried over concentrated sulfuric acid and recrystallized from ethanol/petroleum ether. The yield is 7.2 g. (92% of the theoretical). The melting point is 217–219° C. $[\alpha]_D = -25.9°$ (c.=0.5; glacial acetic acid).

(e) BOC-L-Ala-L-Phe-L-Ileu-Gly-L-Leu-L-Met-NH$_2$ 5.2 g. (10 mmols) of BOC-tetrapeptide-hydrazide are converted to the azide with 1.2 g. (12 mmols) of tert.-butylnitrite in 15 cc. of a 1.5 N solution of hydrogen chloride in tetrahydrofurane. Several drops of water have to be added in order to have the azide go completely into solution. After dilution with 100 cc. of ethyl acetate, the reaction mass is shaken, dried and coupled with a solution of 4.8 g. (15 mmols) of H-L-Leu-L-Met-NH₂·HCl·H₂O and 2.1 cc. (15 mmols) of triethylamine in dimethylformamide. The reaction mixture is stored for two days at 0° C., and the solvent is then evaporated under vacuum. The residue is washed with water, 10% citric acid solution, water, saturated sodium bicarbonate, solution, extremely thoroughly, and then dried. The yield is 5.8 g. corresponding to 77% of the theoretical. The melting point is 248–250° C. $[\alpha]_D = -29.7°$ (c.=1; dimethylformamide).

(f)     H-L-Ala-L-Phe-Ileu-Gly-L-Leu-L-Met-NH₂

4.5 g. (6 mmols) of BOC-hexapeptide-amide are mixed with 15 cc. of 90% trifluoroacetic acid at 0° C., and the reaction mixture is allowed to stand for 1 hour at this temperature. After precipitation by means of ether, the reaction mixture is subjected to suction filtration and the filter residue is dissolved in 10 cc. of 50% ethanol. The pH is adjusted to between 9–10 by the addition of a lithium hydroxide solution, and then the ethanol is to a greater extent distilled off. To complete the precipitation, the reaction mixture is permitted to stand for some time at 0° C. The yield is 2.7 g. corresponding to 70% of the theoretical. The melting point is 241–244° C. $[\alpha]_D = -60.0°$ (c.=0.5; trifluoroacetic acid).

(g) 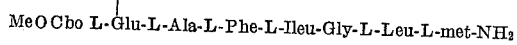
MeOCbo L-Glu-L-Ala-L-Phe-L-Ileu-Gly-L-Leu-L-met-NH₂

0.65 g. (1.5 mmols) of MeOCbo-L-Gly(NH₂)-OPhNO₂ are dissolved in 2 cc. of ethyl acetate and added to a solution of 1.04 g. (1.6 mmols) of H-L-Ala-L-Phe-L-Ileu-Gly-L-Leu-L-Met-NH₂ in dimethylformamide. The reaction mixture is stored for 4 days at 40° C. After concentration under vacuum it is cooked with ethyl acetate and the residue is treated with 10% citric acid solution and water. The yield is 1.06 g., corresponding to 75% of the theoretical. The melting point is 267–269° C. (with decomposition).

(h) 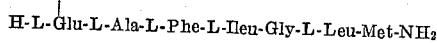
H-L-Glu-L-Ala-L-Phe-L-Ileu-Gly-L-Leu-Met-NH₂

892 mg. (1 mmols) of MeOCbO-heptapeptide-amide are mixed with 0.2 cc. of anisole and 1.3 cc. of trifluoroacetic acid and permitted to stand for 1 hour at room temperature. After precipitation by means of ether, the reaction mixture is dried under vacuum over potassium hydroxide. It is then dissolved in 50% ethanol, the pH is adjusted to a value of 9 by means of a lithium hydroxide solution, and the ethanol is distilled off under vacuum. After standing for some time at 0° C., the reaction mixture is subjected to suction filtration and then dried over phosphorus pentoxide. The yield is 540 mg., corresponding to 70% of the theoretical. The melting point is 245–258° C. (with decomposition). $[\alpha]_D = -68.5°$ (c.=0.5; trifluoroacetic acid).

Analogously to Example 2, instead of using p-methoxycarbobenzoxy-L-glutamine-p-nitrophenyl ester, it is possible to use p-methoxycarbobenzoxy-L-asparagine-p-nitrophenyl ester to produce:

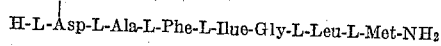
H-L-Asp-L-Ala-L-Phe-L-Ilue-Gly-L-Leu-L-Met-NH₂

The melting point is 215–240° C. $[\alpha]_D = -22.2°$ (c.=0.5; dimethylformamide).

Correspondingly, instead of using carbobenzoxy-L-isoleucine, by the use of carbobenzoxy-L-leucine, it is possible to produce:

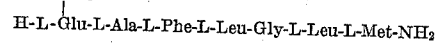
H-L-Glu-L-Ala-L-Phe-L-Leu-Gly-L-Leu-L-Met-NH₂ which melts at 214–220° C. (with decomposition).

$[\alpha]_D = -62.8°$ (c.=0; trifluoroacetic acid) it is also possible to produce:

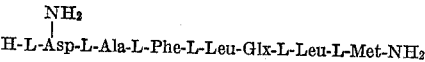
H-L-Asp-L-Ala-L-Phe-L-Leu-Glx-L-Leu-L-Met-NH₂ which melts at 233–243° C. (with decomposition). $[\alpha]_D = -77.2°$ (c.=0.5; trifluoroacetic acid).

EXAMPLE 3

(a)     H-L-Ala-L-Phe-OMe·HCl 69.5 g. of BOC-L-Ala-L-Phe-OMe are dissolved in 100 cc. of glacial acetic acid. Hydrogen chloride is then conducted therethrough for 30 minutes. After an additional 30 minutes precipitation is accomplished by means of ether, and the precipitated product is recrystallized from methanol/ether. The yield is 45.9 g., corresponding to 80% of the theoretical. The melting point is 154–156° C. $[\alpha]_D$ −58.5° (c.=1, glacial acetic acid).

(b)     BOC-Gly-L-Ala-L-Phe-OMe 17.5 g. of BOC-Gly-OH in 150 cc. of dimethylformamide are converted to the mixed anhydride at −15° C. with 14.0 cc. of triethylamine and 10.0 cc. of chloroformic acid-ethyl ester, and reacted with a solution of 31.5 g. of H-L-Ala-L-Phe-OMe·HCl and 15.4 cc. of triethylamine in 150 cc. of dimethylformamide. After working up in the usual manner there is obtained 31.5 g., which corresponds to 77% of the theoretical. The melting point is 106–108% C. $[\alpha]_D$ −24.6° (c.=1, in ethanol).

(c)     BOC-Gly-L-Ala-L-Phe-NHNH₂

The compound is obtained from the methyl ester by reaction with four times the amount of hydrazine hydrate in methanol. The yield is 89% of the theoretical. The melting point is 177–183° C. $[\alpha]_D$ −27.7° (c.=1, glacial acetic acid).

(d)     BOC-L-Ileu-Gly-L-Leu-L-Met-NH₂

22.0 g. (84% of the theoretical) of

BOC-L-Ileu-Gly-L-Leu-L-Met-NH₂ are obtained from 11.6 g. of BOC-L-Ileu-OH and 21.3 g. of H-Gly-L-Leu-L-Met-NH₂·HCl by means of the anhydride method (cloroformic acid-ethyl ester, triethylamine in dimethylformamide at −15 C.). The melting point of the compound is 207–209° C. $[\alpha]_D = -33.2°$ (c.=1, glacial acetic acid).

(e)     H-L-Ileu-Gly-L-Leu-L-Met-NH₂·HCl 21.2 g. of the obtained BOC-compound are dissolved in 150 cc. of glacial acetic acid. The protective group is split off by conducting hydrogen chloride therethrough for ½ hour. After precipitation with ether, the compound is recrystallized from methanol/ether. The yield is 14.0 g., corresponding to 75% of the theoretical, of H-L-Ileu-Gly-L-Leu-L-Met-NH₂HCl The compound melts at 160–200° C. (with decomposition). $[\alpha]_D = -27.1°$ (c=1, methanol).

(f)     BOC-Gly-L-Ala-L-Phe-L-Ileu-Gly-L-Leu-L-Met-NH₂

1.22 g. of BOC-Gly-L-Ala-L-Phe-NHNH₂ are suspended in 3.6 cc. of a 2.2 N solution of hydrogen chloride in tetrahydrofurane at −20° C., and converted with 0.37 cc. of tert.-butylnitrite into the azide. After addition of 40 cc. of cold ethyl acetate it is washed with a saturated solution of sodium bicarbonate and dried over sodium sulfate. This azide solution is reacted with a mixture of 1.4 g. of H-L-Ileu-Gly-L-Leu-L-Met-NH₂·HCl and 0.42 cc. of triethylamine in 15 cc. of dimethylformamide. After concentration, it is washed with 10% citric acid solution, water, sodium bicarbonate solution and water, and then dried. The yield is 2.16 g., corresponding to 89% of the theoretical, of BOC-Gly-L-Ala-L-Phe-L-Ileu-Gly-L-Leu-L-Met-NH₂ which melts at 252–225° C. $[\alpha]_D = -27.0°$ (c.=1, dimethylformamide).

(g) H-Gly-L-Ala-L-Phe-L-Ileu-Gly-L-Leu-L-Met-NH₂HCl·1.5H₂O

H-Gly-L-Ala-L-Phe-L-Ileu-Gly-L-Leu-L-Met-NH₂HCl·1.5H₂O is obtained in a yield of 1.6 g. (88% of the theoretical) from 2.0 g. of the BOC-compound by splitting off of the protective blocking group by means by hydrogen chloride in glacial acetic acid as previously described. The melting point is 240–260° C.

$[\alpha]_D = -45.8°$ (c.=1, glacial acetic acid).

The corresponding valine derivative is obtained in analogous manner from BOC-Gly-L-Ala-L-Phe-NHNH₂ and H-L-Val-Gly-L-Leu-L-Met-NH₂. By splitting off of the protective groups the resulting heptapeptide-amide-hydrochloride is obtained which is then converted into the free base by means of lithium hydroxide in ethanol/water. The free base is H-Gly-L-Ala-L-Phe-L-Val-Gly-L-Leu-L-Met-NH₂;

M.P. 225–229° C. $[\alpha]_D = -52.2°$ (c=1, trifluoroacetic acid).

The necesary tetrapeptide-amide

BOC-L-Val-Gly-L-Leu-L-Met-NH₂ which is needed for this synthesis can also be obtained from BOC-L-Val-Gly-NHNH₂ and H-L-Leu-L-Met-NH₂.

H-Sar-L-Ala-L-Phe-L-Ileu-Gly-L-Leu-L-Met-NH₂·HCl,

M.P. 242–244° C. $[\alpha]_D = -45.9°$ (c.=1, glacial acetic acid), and

H-Sar-L-Ala-L-Phe-L-Val-Gly-L-Leu-L-Met-NH₂·HCl,

M.P. 248–249° C. $[\alpha]_D = -43.2°$ (c=1, glacial acetic acid), are obtained in analogous manner from BOC-Sar-L-Ala-L-Phe-NHNH₂ and the corresponding tetrapeptide-amide.

EXAMPLE 4

(a) BOC-L-Lys(BOC)-L-Ala-L-Phe-L-Val-Gly-L-Leu-L-Met-NH₂

The compound obtained according to Example 1(k) is subjected to splitting off of the BOC-group by means of trifluoroacetic acid, and the reaction product by dissolution in ethanol, addition of an equivalent amount of lithium hydroxide and precipitation with water is converted into the free amine. 6.3 g. thereof is dissolved in dimethylformamide and mixed with a solution of 4.7 g. of Di-BOC-L- Lysine-OPhNO₂ in ethyl acetate and maintained therein for 3 days at 40° C. The resulting precipitated reaction product is washed with ether. The yield is 7.5 g. The melting point is 237–239° C. $[\alpha]_D = -37.3°$ (c=0.5 glacial acetic acid).

(b) H-L-Lys-L-Ala-L-Phe-L-Val-Gly-L-Leu-L-Met-NH₂

H-L-Lys-L-Ala-L-Phe-L-Val-Gly-L-Leu-L-Met-NH₂ can be obtained from the BOC-compound by splitting off of the protective group with hydrogen chloride in glacial acetic acid. It is subjected to chromatography on a carboxy methyl cellulose column for purification (ammonium acetate gradient, pH 5.5; 0.001 to 0.2 molar).

In analogous manner it is possible to obtain: H-Lys-Ala-Phe-Ileu-Gly-Leu-Met-NH₂ and H-Lys-Ala-Phe-Leu - Gly-Leu-Met-NH₂.

EXAMPLE 5

L-Pyroglu-L-Ala-L-Phe-L-Leu-Gly-L-Leu-L-Met-NH₂

0.45 g. of MeOCbo-L-Pyroglu-OPhNO₂ are reacted as described in Example 4(a) with 0.78 g. of the hexapeptide H-L-Ala-L-Phe-L-Leu-Gly-L-Leu-L-Met-NH₂ (obtained analogously to the Val-compound (note Example 1)). The yield is 0.55 g. The melting point is 238–245° C. The protective group is split off from this compound by means of trifluoroacetic acid in the presence of anisole. For purification purposes the compound is rubbed several times with hot ethanol and then filtered off under suction. The melting point is 279–281° C. (with decomposition). $[\alpha]_D = -54.7°$ (c.=0.5, glacial acetic acid).

EXAMPLE 6

This example is carried out in accordance with Schema IV.

(a) BOC-L-Ser-L-Ala-L-Phe-NHNH₂

BOC-L-Ser-NHNH₂ is converted into the azide in normal manner by means of tert.-butylnitrite, and then reacted with H-L-Ala-L-Phe-OMe. The thus obtained tripeptide-methyl ester is converted into the hydrazide by means of hydrazine hydrate.

(b) BOC-L-Ser-L-Ala-L-Phe-L-Ileu-Gly-L-Leu-L-Met-NH₂

The above compound is obtained by means of the azide method in normal manner as shown in Example 6a from BOC-L-Ser-L-Ala-L-Phe-NHNH₂ and H-L-Ileu-Gly-L-Leu-L-Met-NH₂.

(c) H-L-Ser-L-Ala-L-Phe-L-Ileu-Gly-L-Leu-L-Met-NH₂

The above compound is obtained from the BOC-compound by splitting off of the protective group with trifluoroacetic acid and normal purification procedures.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Polypeptide of the formula:

R-L-alanyl-L-phenylalanyl-L-leucyl-glycyl-L-leucyl-L-methioninamide wherein R is selected from the group consisting of hydrogen and natural L-α-amino acid radicals selected from the group consisting of radicals of glycine, alanine, valine, leucine, isoleucine, asparagine, glutamine, serine, threonine, cysteine, methionine, phenylanalanine, tyrosine, proline, oxyproline, lysine, histidine, arginine, ornithine, norleucine, norvaline, α-aminobutyric acid, α,γ-diaminobutyric acid, pyroglutamic acid, sarcosine, N-methylvaline, N-methylleucine, and tryptophane.

2. Polypeptide of the formula:

R-L-alanyl-L-phenylalanyl-L-valyl-glycyl-L-leucyl-L-methioniamide wherein R is selected from the group consisting of hydrogen and natural L-α-amino acid radicals selected from the group consisting of the radicals of glycine, alanine, valine, leucine, isoleucine, asparagine, glutamine, serine, threonine, cysteine, methionine, phenylanalanine, tyrosine, proline, oxyproline, lysine, histidine, arginine, ornithine, norleucine, norvaline, α-aminobutyric acid, α,γ-diaminobutyric acid, pyroglutamic acid, sarcosine, N-methylvaline, N-methylleucine and tryptophane.

3. L-alanyl-L-phenylalanyl-L-leucyl-glycyl-L - leucyl-L-methioninamide.

4. Glycyl-L-alanyl-L - phenylalanyl-L-leucyl-glycyl-L-leucyl-L-methioninamide.

5. Glycyl-L-alanyl - L-phenylalanyl - L-valyl-glycyl-L-leucyl-L-methioninamide.

6. L-lysyl-L-alanyl-L-phenylalanyl-L - leucyl-glycyl-L-leucyl-methioninamide.

7. L-lysyl-L-alanyl-L-phenylalanyl - L - valyl-glycyl-L-leucyl-methioninamide.

8. L-pyroglutamyl-L-alanyl - L - phenylalanyl-L-leucyl-glycyl-L-leucyl-L-methioninamide.

9. L-alanyl - L-phenylalanyl-L-valyl-glycyl-L-leucyl-L-methioninamide.

10. L-glutaminyl-L-alanyl-L-phenylalanyl-L - leucylglycyl-L-leucyl-L-methioninamide.

11. L-asparaginyl-L-alanyl - L - phenylalanyl-L-leucyl-glycyl-L-leucyl-L-methioninamide.

12. L-sarcosyl-L-alanyl-L-phenylalanyl - L-valyl-glycyl-L-leucyl-L-methioninamide.

13. L-lysyl-L-alanyl-L-phenylalanyl - L - isoleucyl-glycyl--L-leucyl-methioninamide.

References Cited

UNITED STATES PATENTS

| | | | |
|---|---|---|---|
| 3,300,469 | 11/1967 | Bernardi et al. | 260—112.5 |
| 3,309,353 | 3/1967 | Boissonnas et al. | 260—112.5 |
| 3,328,382 | 6/1967 | Boissonnas et al. | 260—112.5 |
| 3,341,510 | 9/1967 | Chillemi | 260—112.5 |
| 3,268,502 | 8/1966 | Lubke et al. | 260—112.5 |
| 3,272,790 | 9/1966 | Bernardi et al. | 260—112.5 |
| 3,299,035 | 1/1967 | Boissonnas et al. | 260—112 |
| 2,786,049 | 3/1957 | Lundgren | 260—112 |
| 2,766,225 | 10/1956 | Kenner | 260—112 |
| 3,203,860 | 8/1965 | Wu et al. | 167—65 |
| 3,198,705 | 8/1965 | Cummings | 167—65 |

FOREIGN PATENTS 623,243 4/1963 Belgium.
620,168 1/1963 Belgium.

OTHER REFERENCES

Schroder et al., Experientia 20, 19-21 (1964).

LEWIS GOTTS, *Primary Examiner.*

M. M. KASSENOFF, *Assistant Examiner.*

U.S. Cl. X.R.

424—177